May 18, 1926. Re. 16,351

M. CARUSO

TOY CAR WHEEL

Original Filed April 24, 1923

INVENTOR
MARIO CARUSO
BY
Joel B. Liberman
ATTORNEY

Reissued May 18, 1926. Re. 16,351

UNITED STATES PATENT OFFICE.

MARIO CARUSO, OF NAPLES, ITALY, ASSIGNOR TO THE LIONEL CORPORATION, A CORPORATION OF NEW YORK.

TOY CAR WHEEL.

Original No. 1,529,870, dated March 17, 1925, Serial No. 634,312, filed April 24, 1923. Application for reissue filed March 1, 1926. Serial No. 91,635.

This invention relates to toy car wheels. One object thereof is to provide a wheel for toy cars, toy locomotives, and the like toy vehicles, which shall be comparatively cheap and simple to manufacture, and efficient in operation to a high degree.

Another object of the invention is to provide a toy car wheel which may be manufactured by a simple die casting process and shall have a smooth tread so as to permit of its effective use in connection with the toy vehicle.

Toy car wheels, particularly those for use in toy locomotives must have considerable strength to withstand conditions of service. They have been commonly made from cast iron. These wheels may relatively take the shape of the standard locomotive wheel and function satisfactorily, but are likely to rust or corrode, and have other objections.

The desired shape for a car wheel may be obtained economically by employing a die casting, which has the advantages of coming from the dies in an accurate, finished condition. These castings do not corrode readily, and may be painted more easily than cast iron wheels. Die cast wheels alone were found, however, to be too soft for continued use on the metal rails in toy track layouts. They wear rapidly.

According to the present invention the treads of these die cast wheels are provided with an applied tread of sheet metal securely fitted in place. Such treads are smooth and wear resistant, and improve the general appearance of the toy vehicle carrying the wheel.

Other objects of this invention will in part be obvious and in part hereinafter pointed out.

The invention accordingly consists in the features of construction, combinations of elements and arrangement of parts which will be exemplified in the construction hereinafter described and of which the scope of invention will be indicated in the following claims.

In the accompanying drawing, in which is shown two of various possible illustrative embodiments of this invention, Figure 1 is a vertical cross-sectional view of the toy wheel embodying my invention;

Figure 1:
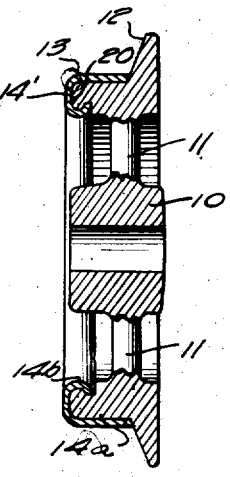
Figure 2:
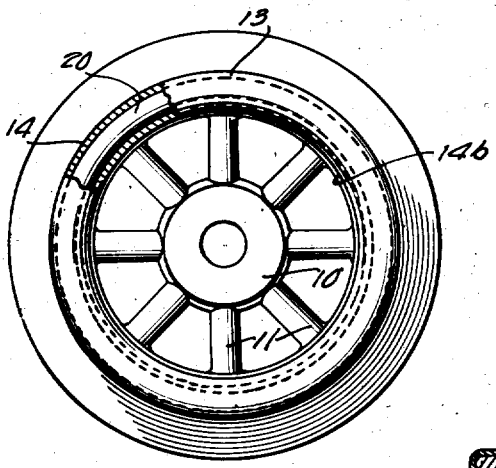
Figure 2 is a face view thereof partly broken away.

Referring in detail to the drawing, 10 indicates the hub from which extend the radial spokes 11. 12 is the flange of the wheel and 13 indicates the tread. The various parts just described are preferably formed in one operation by die-casting. In order to provide a smooth tread surface and accomplish the above objects, I provide the tread with a facing 14 in the form of a thin annular member of smooth sheet which sheet may be spun on or otherwise tightly forced on the tread. This annular member comprises a tire portion $14^a$ which fits snugly over the tread surface of the die casting, a portion 14′ fitting the side face 20 of the die casting, and a portion $14^b$ being forced inside the tread portion. This latter mentioned portion of the sheet metal tread may be spun or clinched in place as indicated, if desired.

Figure 3:
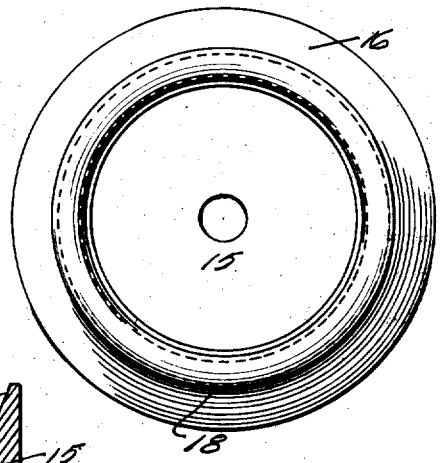
Figure 3 is a face view of a modified form of the invention showing a wheel of the disc type.
Figure 4:
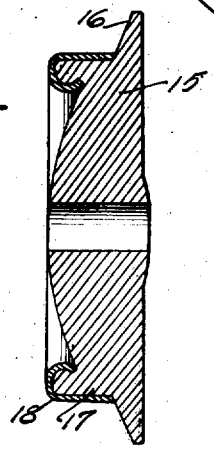
Figure 4 is a vertical cross-sectional view of the wheel shown in Figure 3.

In Figures 3 and 4 I show a modification of the invention as applied to a toy wheel which imitates the disc type of automobile wheel, 15 indicating the whel body, 16 the flange and 17 the tread. A similar facing member 18 is spun on or otherwise securely fitted over the tread in the manner and for the purpose already described.

Toy wheels made as above described utilize the advantages of die castings as regards accuracy, cheapness, and general appearance, without sacrifice of serviceability due to the softness of the metal. The harder sheet metal tread stands the wear on the tracks.

As various possible embodiments of the above invention might be made and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a toy wheel for toy vehicles, a wheel body having a rim tread portion and a facing for said tread portion fitted snugly thereover and made of comparatively thin sheet metal, said facing having an edge thereof inturned and clinched on the interior side of the rim tread.

2. In a toy wheel for toy vehicles, a wheel body including a die cast flange portion and rim tread portion, and a facing for said tread portion fitted snugly thereover inturned at its free edge portion and clinched on the interior side of the rim tread, said facing being formed of comparatively thin sheet metal.

3. In a toy wheel for toy vehicles, in combination with the rim tread of the wheel, a facing for said tread, comprising an annular member of comparatively thin sheet metal spun on said tread, said member having an edge thereof inturned and clinched on the interior side of the rim tread.

4. In a toy wheel for toy vehicles, in combination with a die cast wheel body including a hub, radial spokes, flange and rim tread, a facing for said tread comprising an annular member of comparatively thin sheet metal spun to extend from the flange over said tread, inturned at its free edge portion and clinched on the interior side of the rim tread.

5. A toy railroad wheel made of a soft die casting and having a tread portion, and a wear resisting portion in the form of a sheet metal tread tightly forced onto the tread portion of the die casting.

6. A toy railroad wheel having a tread portion of soft die casting metal, and a sheet metal tread portion forced into position on the tread portion.

7. In a wheel for toy cars, an integral body in the form of a soft die casting and a tread in the form of an annular sheet metal element forced onto the die casting.

8. A die cast wheel for toy railroad cars having a tread, a narrow side face adjacent the tread portion and an undercut portion extending inwardly from the side of the wheel, and a sheet metal tread forced onto the die cast wheel and having portions engaging the tread, the side face and said undercut portions thereof.

9. The combination with a die cast toy car wheel, of an annular sheet metal tread of U-shaped cross section forced onto the side of the die casting to provide a wear proof tread portion and a covering for the side face of the wheel remote from the flange.

MARIO CARUSO.